(12) United States Patent
Kumamoto et al.

(10) Patent No.: US 6,903,041 B2
(45) Date of Patent: Jun. 7, 2005

(54) SOLID CATALYST COMPONENT AND CATALYST FOR OLEFIN POLYMERIZATION, AND PROCESS FOR PRODUCING OLEFIN POLYMER

(75) Inventors: Shin-ichi Kumamoto, Ichihara (JP); Makoto Satoh, Ichihara (JP); Hideki Ohshima, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 259 days.

(21) Appl. No.: 09/886,375

(22) Filed: Jun. 22, 2001

(65) Prior Publication Data

US 2003/0195108 A1 Oct. 16, 2003

Related U.S. Application Data

(63) Continuation of application No. 09/260,540, filed on Mar. 2, 1999, now abandoned.

(30) Foreign Application Priority Data

Mar. 11, 1998 (JP) .......................................... 10-059846
Mar. 11, 1998 (JP) .......................................... 10-059848

(51) Int. Cl.$^7$ .......................... B01J 31/00; B01J 37/00; C08F 4/02; C08F 4/60
(52) U.S. Cl. ....................... 502/128; 502/118; 502/125; 502/126; 502/127; 502/132; 502/133
(58) Field of Search ................................ 502/116, 125, 502/126, 127, 128, 132, 133, 103, 114, 115, 118, 150, 158

(56) References Cited

U.S. PATENT DOCUMENTS

| 3,642,746 | A | 2/1972 | Kashiwa et al. |
|---|---|---|---|
| 4,107,413 | A | 8/1978 | Giannini et al. |
| 4,157,435 | A | 6/1979 | Toyota et al. |
| 4,223,117 | A | 9/1980 | Sano et al. |
| 4,242,231 | A | 12/1980 | Ueno et al. |
| 4,298,718 | A | 11/1981 | Mayr et al. |
| 4,399,055 | A | 8/1983 | Matsuura et al. |
| 4,412,049 | A | 10/1983 | Shiga et al. |
| 4,504,637 | A | 3/1985 | Shiga et al. |
| 4,551,439 | A | 11/1985 | Harada et al. |
| 4,617,284 | A | 10/1986 | Matsuura et al. |
| 4,672,050 | A | 6/1987 | Sasaki et al. |
| 4,822,763 | A | 4/1989 | Matsuura et al. |
| 4,900,706 | A | 2/1990 | Sasaki et al. |
| 5,556,820 | A | 9/1996 | Funabashi et al. |
| 5,744,414 | A | 4/1998 | Jenny |
| 5,965,478 | A | 10/1999 | Goto et al. |
| 6,028,149 | A | 2/2000 | Luciani et al. |
| 6,838,412 | B2 * | 1/2005 | Satoh et al. ................ 502/116 |

FOREIGN PATENT DOCUMENTS

| DE | 19727065 | 1/1998 |
|---|---|---|
| EP | 0087100 | 8/1983 |
| EP | 0106141 | 4/1984 |
| EP | 0230707 | 8/1987 |
| EP | 0317200 | 5/1989 |
| EP | 0504744 | 9/1992 |
| EP | 0553806 | 8/1993 |
| GB | 1498862 | 1/1978 |
| JP | 343283 | 7/1991 |
| JP | 457685 | 9/1992 |
| WO | 9745460 | 12/1997 |

OTHER PUBLICATIONS

60–101 105, Japan Patent Abstract published May 6, 1985, Miyoshi.
63–215702, Japan Patent Abstract published Aug. 9, 1988, Kawei.
Patent Abstracts of Japan, vol. 013, No. 003, Jan. 6, 1989.
Database WPI, Derwent Publications Ltd., London, GB; AN 1989–352205, XP002174263, Oct. 19, 1989.
Patent Abstracts of Japan, vol. 009, No. 241, Sep. 27, 1985.

* cited by examiner

*Primary Examiner*—David Sample
*Assistant Examiner*—J. Pasterczyk
(74) *Attorney, Agent, or Firm*—Stevens, Davis, Miller & Mosher, L.L.P.

(57) ABSTRACT

There are provided;
  (i) a solid catalyst component obtained by contacting a trivalent titanium atom-containing solid catalyst component precursor (C) with a halogeno compound (A) of the 13 or 14 group of elements in the periodic table of the elements and an electron donor (B), or a solid catalyst component obtained by contacting an intermediate product with a titanium-halogen bond-carrying compound (D), the intermediate product being obtained by contacting the solid catalyst component precursor (C) with a halogeno compound (A') of the 14 group of elements in the periodic table of the elements and the electron donor (B), or a solid catalyst component comprising a magnesium atom, a titanium atom, a halogen atom and an electron donor and having a relative surface area of not more than 30 m$^2$/g, the catalyst component being superior in a particle form, and
  (ii) a catalyst comprising the solid catalyst component and an organoaluminum compound, the catalyst being high in polymerization activity.

16 Claims, No Drawings

SOLID CATALYST COMPONENT AND CATALYST FOR OLEFIN POLYMERIZATION, AND PROCESS FOR PRODUCING OLEFIN POLYMER

CROSS-REFERENCE TO RELATED APPLICATIONS

This application is a continuation application of U.S. Ser. No. 09/260,540, filed Mar. 2, 1999, now abandoned, the entire disclosure is incorporated herein by reference.

FIELD OF THE INVENTION

The present invention relates to a solid catalyst component and a catalyst for olefin polymerization, and a process for producing an olefin polymer. More specifically, the present invention relates to a solid catalyst component and a catalyst for olefin polymerization, and a process for producing an olefin polymer, which are suitable for gas phase polymerization and slurry polymerization processes. In the present specification, the term "olefin polymer" is intended to mean a homopolymer of an olefin and a copolymer of two or more olefins different from one another.

BACKGROUND OF THE INVENTION

When the activity of a catalyst (amount of olefin polymer obtained per unit catalyst) used for the olefin polymerization to produce the olefin polymer is sufficiently high, there is no need to remove a catalyst residue from the polymer obtained after the polymerization, and therefore the production process of the polymer can be simplified. Thus, such a catalyst can be said to be extremely high in an industrial utility value.

In the production of the olefin polymer, it is desired that adhesion of the polymer to a polymerization vessel is as little as possible, because the adhesion causes various problems in operation to result in deterioration of an operation efficiency.

With respect to powder properties of the olefin polymer obtained, it is desired from a viewpoint of an operational stability and efficiency that the bulk density thereof is high, its particle size distribution is narrow, and its flowability is superior.

Further, it is desired that the content of lower molecular weight components in the olefin polymer obtained is as low as possible, because the lower molecular weight components affect the transparency, impact resistance and blocking property of a film prepared from the olefin polymer.

In the field of solid catalysts for olefin polymerization, polymerization activity has been markedly improved by using a solid catalyst component obtained by a combination use of a specific magnesium compound and a specific titanium compound, as disclosed in, for example, JP-B-46-34092, JP-B-47-41676, JP-B-55-23561 and JP-B-57-24361.

In the polymerization of propylene, it is known that a polymer of high crystallinity can be produced with a high activity by using an oxygen-containing electron donor, such as esters, as an internal donor of a solid catalyst component, as disclosed in, for example, JP-B-52-39431, JP-B-52-36786, JP-B-01-28049 and JP-B-03-43283.

However, the olefin polymer obtained by using the former catalyst system disclosed in, for example, JP-B-46-34092, is not satisfactory in its powder properties and blocking property, and also when the latter catalyst system disclosed in, for example, JP-B-52-39431, is used for copolymerization of ethylene with another α-olefin, the resulting olefin copolymer is not satisfactory in its powder properties and blocking property.

Each of the references referred to herein is incorporated by reference in its entirety.

SUMMARY OF THE INVENTION

An object of the present invention is to provide a solid catalyst component and a catalyst for olefin polymerization, and further provide a process for producing an olefin polymer which is low in its content of lower molecular weight components.

Another object of the present invention is to provide a solid catalyst component for olefin polymerization, which is extremely superior in its particle properties, and a catalyst for olefin polymerization, which is sufficiently high in polymerization activity per unit catalyst, so that there is no need to remove catalyst residue from the polymer obtained after the polymerization, and further provide a process for producing an olefin polymer which is superior in powder properties and that possesses a low content of lower molecular weight components.

The present inventors have undertaken extensive studies to accomplish their objects in the field of olefin polymerization, and, as a result, have found that a solid catalyst component having a specific range of a relative surface area can accomplish their objects, and have also found that a solid catalyst component obtained by contacting a specific solid catalyst component precursor with specific compounds can accomplish their objects, and thereby the present invention has been obtained.

The present invention provides a solid catalyst component (I) for olefin polymerization, which is obtained by contacting a solid catalyst component precursor (C) containing a magnesium atom, a titanium atom and a hydrocarbyloxy group, with a halogeno compound (A) of the 13 (IIIa) or 14 (IVa) group of elements in the periodic table of the elements, and an electron donor (B).

The present invention also provides a solid catalyst component (I') for olefin polymerization, which is obtained by contacting an intermediate product with a compound (D) having a titanium-halogen bond, wherein the intermediate product is obtained by contacting a solid catalyst component precursor (C) containing a magnesium atom, titanium atom and a hydrocarbyloxy group with a halogeno compound (A') of the 14 (IVa) group of elements in the periodic table of the elements, and an electron donor (B).

The present invention further provides a solid catalyst component (I") for olefin polymerization comprising a magnesium atom, a titanium atom, a halogen atom and an electron donor, and having a relative surface area of not more than 30 $m^2/g$.

Further, the present invention provides a catalyst for olefin polymerization, which comprises the solid catalyst component (I), (I') or (I") and an organoaluminum compound (II)

Furthermore, the present invention provides a process for producing an olefin polymer, which comprises polymerizing an olefin with the catalyst.

DETAILED DESCRIPTION OF THE INVENTION

The following description is not to be construed as limiting the present invention, as those of ordinary skill in the art will realize that various changes can be made in the various materials and procedures taught herein, without departing from the spirit or scope of the present inventive discovery. In this respect, the present invention is only limited by the scope of the claims appended hereto, and the equivalents encompassed thereby. The present invention is explained in detail as follows.

[Solid Catalyst Component]

The solid catalyst component according to the present invention is a solid catalyst component (I) which can be obtained using a halogeno compound (A) of the 13 (IIIa) or 14 (IVa) group of elements in the periodic table of elements, an electron donor (B) and a solid catalyst component precursor (C), or a solid catalyst component (I') which can be obtained using the halogeno compound (A') of the 14 (IVa) group of the elements, the electron donor (B), the solid catalyst component precursor (C) and a Ti-halogen bond-carrying compound (D), or a solid catalyst component (I") comprising a magnesium atom, a titanium atom, a halogen atom and an electron donor, and having a relative surface area of not more than 30 m²/g.

The solid catalyst components of the present invention utilize therein a halogeno compound (A or A') of the 13 (IIIa) or 14 (IVa) group of elements in the periodic table of the elements. In this respect, groups 13–14 in the periodic table of the elements are those previously referred to as groups (IIIa) and (IVa) in the periodic table of the elements.

The halogeno compound (A) of the 13 (IIIa) or 14 (IVa) group of elements or the halogeno compound (A') of the 14 (IVa) group of elements used in the present invention includes those having at least one 13 (IIIa) group element-halogen bond or at least one 14 (IVa) group element-halogen bond. Among them, preferred is a compound represented by the following formula, $$MR_{m-a}X_a$$

wherein M is an atom belonging to the 13 (IIIa) or 14 (IVa) group in the periodic table of the elements, R is a hydrocarbon group having 1 to 20 carbon atoms, X is a halogen atom, m is a valence of M, and "a" is a number satisfying $0 < a \leq m$.

The atom belonging to the 13 (IIIa) group of elements represented by M includes, for example, B, Al, Ga, In and Tl. Of these, B and Al are preferred, and Al is more preferred. The atom belonging to the 14 (IVa) group of elements represented by M includes, for example, C, Si, Ge, Sn and Pb. Of these, Si, Ge and Sn are preferred, and Si and Sn are more preferred. Among them, those belonging to the 14 (IVa) group are particularly preferred, and Si is most preferred.

With respect to m and "a", when M is, for example, Si, m is 4, and "a" is preferably 3 or 4.

Thus, the most preferred halogeno compound (A) or (A') can be represented by the following formula, $$SiR_{4-a}X_a$$

wherein R and X are as defined above, and "a" is a number satisfying $0 < a \leq 4$, preferably 3 or 4.

The halogen atom represented by X includes F, Cl, Br and I. Of these, Cl is preferred.

Examples of R are alkyl groups such as methyl, ethyl, n-propyl, i-propyl, n-butyl, i-butyl, amyl, i-amyl, hexyl, heptyl, octyl, decyl and dodecyl, aryl groups such as phenyl, tolyl, cresyl, xylyl and naphthyl, cycloalkyl groups such as cyclohexyl and cyclopentyl, allyl groups such as propenyl, and aralkyl groups such as benzyl. Among them, alkyl and aryl groups are preferred. Particularly, methyl, ethyl, n-propyl, phenyl and p-tolyl are preferred.

Specific examples of the halogeno compounds of the 13 (IIIa) group of elements in the periodic table of the elements are trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methydichlorogallium, ethyldichlorogallium, phenyldichlorogallium, cyclohexyldichlorogallium, dimethylchlorogallium, methylethylchlorogallium, indiumchloride, indiumtrichloride, methylindium dichloride, phenylindium dichloride, dimethylindium chloride, thallium chloride, thallium trichloride, methylthallium dichloride, phenylthallium dichloride, dimethylthallium chloride, and compounds named by replacing the chloro or chloride in the above named compounds with fluoro or fluoride, bromo or bromide, and iodo or iodide, respectively.

Specific examples of the halogeno compounds of the 14 (IVa) group of elements in the periodic table of the elements are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-i-butyldichlorotin, diphenyldichlorotin, divinyldichlorotin, methyltrichlorotin, phenyltrichlorotin, dichlorolead, methylchlorolead, phenylchlorolead and compounds named by replacing the chloro in the above named compounds with fluoro, bromo and iodo, respectively.

Among these halogeno compounds (A) of the 13 (IIIa) or 14 (IVa) group of elements, or the halogeno compound (A') of the 14 (IVa) group of elements, tetrachlorosilane, phenyltrichlorosilane, methyltrichlorosilane, ethyltrichlorosilane, n-propyltrichlorosilane and p-tolyltrichlorosilane are particularly preferably used from a viewpoint of polymerization activity.

The electron donor (B) used in the present invention includes oxygen-containing electron donors and nitrogen-containing electron donors. Examples of the oxygen-containing electron donors are alcohols, phenols, ketones, aldehydes, carboxylic acids, organic or inorganic acid esters, ethers, acid amides and acid anhydrides. Examples of the nitrogen-containing electron donors are ammonia, amines, nitriles and isocyanates. Of these, an organic acid ester and an ether are preferably used.

As the organic acid ester, mono- or poly-valent carboxylic acid esters are preferred, and examples thereof are saturated or unsaturated aliphatic carboxylic acid esters, alicyclic carboxylic acid esters and aromatic carboxylic acid esters.

Specific examples of the esters are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-2-ethylhexyl phthalate, di-n-octyl phthalate and diphenyl phthalate.

Preferable ethers are dialkyl ethers, and diether compounds represented by the following formula,

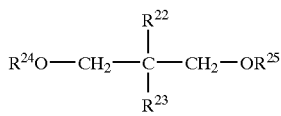

wherein $R^{22}$ to $R^{25}$ are independently of one another an alkyl, aryl or aralkyl group having up to 20 carbon atoms, provided that $R^{22}$ and $R^{23}$ may be a hydrogen atom.

Specific examples of the ethers are dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-di-i-butyl-1,3-dimethoxypropane, 2-ethyl-2-butyl-1,3-dimethoxypropane, 2-n-propyl-2-cyclopentyl-1,3-dimethoxypropane, 2,2-dimethyl-1,3-diethoxypropane and 2-n-propyl-2-cyclohexyl-1,3-diethoxypropane.

Among these electron donors (B), dialkyl esters of aromatic dicarboxylic acids are particularly preferably used, and dialkyl esters of phthalic acids are particularly more preferably used.

The solid catalyst component precursor (C) used in the present invention is a solid component containing a magnesium atom, a titanium atom and a hydrocarbyloxy group. Preferable examples thereof are a solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0<a\leq 4$, with an organomagnesium compound (3) in the presence of an organosilicon compound (1) having an Si—O bond, as disclosed in JP-B-3-043283, and a solid product obtained by reducing the titanium compound (2) with the organomagnesium compound (3) in the presence of the organosilicon compound (1) and a porous carrier (4), as disclosed in JP-B-4-057685.

Examples of $R^1$ in the titanium compound (2) represented by the above formula, are alkyl groups such as methyl, ethyl, propyl, i-propyl, butyl, i-butyl, amyl, i-amyl, hexyl, heptyl, octyl, decyl and dodecyl, aryl groups such as phenyl, cresyl, xylyl and naphthyl, cycloalkyl groups such as cyclohexyl and cyclopentyl, allyl groups such as propenyl, and aralkyl groups such as benzyl.

Among these groups, alkyl groups having 2 to 18 carbon atoms or aryl groups having 6 to 18 carbon atoms are preferred. Of these, straight-chain alkyl groups having 2 to 18 carbon atoms are particularly preferred. In the present invention, titanium compounds having two or more different $OR^1$ groups can be used.

The halogen atom X in the formula, $Ti(OR^1)_a X_{4-a}$, includes, for example, chlorine, bromine and iodine. Of these, chlorine is particularly preferred.

With respect to "a" in the formula, $Ti(OR^1)_a X_{4-a}$, a number satisfying $2\leq a\leq 4$ is preferred, and particularly preferred is 4.

The titanium compound (2) can be prepared in a conventional manner, for example, by reacting $Ti(OR^1)_4$ with $TiX_4$, wherein $R^1$ and X are as defined above, or by reacting $TiX_4$ with a corresponding alcohol, for example, $R^1OH$, wherein X and $R^1$ are as defined above, in each predetermined amount ratio.

Preferable examples of the Si—O bond-carrying organosilicon compound (1) are those represented by any one of the following formulas, $$Si(OR^3)_b R^4{}_{4-b},$$

$$R^5(R^6{}_2SiO)_c SiR^7{}_3 \text{ or}$$

$$(R^8{}_2SiO)_d$$

wherein $R^3$ is a hydrocarbon group having 1 to 20 carbon atoms, $R^4$, $R^5$, $R^6$, $R^7$ and $R^8$ are independently of one another a hydrocarbon group having 1 to 20 carbon atoms or a hydrogen atom, b is a number satisfying $0<b\leq 4$, c is an integer of from 1 to 1000, and d is an integer of from 2 to 1000.

Specific examples of the organosilicon compound (1) are tetramethoxysilane, dimethyldimethoxysilane, tetraethoxysilane, triethoxyethylsilane, diethoxydiethylsilane, ethoxytriethylsilane, tetra-i-propoxysilane, di-i-propoxy-di-i-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, poly(dimethylsiloxane), poly(diphenylsiloxane), poly(methylhydrosiloxane) and poly(phenylhydrosiloxane).

Among these organic silicon compounds, more preferable are alkoxysilane compounds represented by the formula, $$Si(OR^3)_b R^4{}_{4-b}$$

wherein $R^3$, $R^4$ and b are as defined above, provided that b is preferably a number satisfying $1\leq b\leq 4$. Of these, tetraalkoxysilane compounds having a number of 4 as b are particularly preferred.

As the organomagnesium compound (3), any types of organomagnesium compounds having a magnesium-carbon bond can be used. Particularly preferably used are Grignard compounds represented by the following formula, $$R^9MgX,$$

wherein $R^9$ is a hydrocarbon group having 1 to 20 carbon atoms and X is a halogen atom, and dihydrocarbyl magnesium compounds represented by the following formula, $$R^{10}R^{11}Mg$$

wherein $R^{10}$ and $R^{11}$ are the same or different and independently of each other a hydrocarbon group having 1 to 20 carbon atoms. Specific examples of $R^9$ to $R^{11}$ are alkyl, aryl, aralkyl and alkenyl groups such as methyl, ethyl, propyl, i-propyl, butyl, sec-butyl, tert-butyl, i-amyl, hexyl, octyl, 2-ethylhexyl, phenyl and benzyl. It is particularly preferable to use the Grignard compounds in the form of an ether solution thereof from a viewpoint of catalytic ability.

In the present invention, the organomagnesium compound (3) can be used in the form of a hydrocarbon soluble complex prepared from the organomagnesium compound (3) and an organometallic compound capable of solubilizing the organomagnesium compound in a hydrocarbon. Examples of the organometallic compounds are those of Li, Be, B, Al and Zn.

The porous carrier (4) includes those well known. Examples thereof are porous inorganic oxides such as $SiO_2$, $Al_2O_3$, MgO, $TiO_2$ and $ZrO_2$, and organic porous polymer such as polystyrene, styrene-divinylbenzene copolymer, styrene-ethylene glycol-methyl dimethacrylate copolymer, polymethylacrylate, polyethylacrylate, methyl acrylate-divinylbenzene copolymer, polymethylmethacrylate, methyl methacrylate-divinylbenzene copolymer, polyacrylonitrile, acrylonitrile-divinylbenzene copolymer, polyvinyl chloride, polyethylene and polypropylene. Of these, organic porous polymers, particularly styrene-divinylbenzene copolymer and acrylonitrile-divinylbenzene copolymer are preferably used.

With respect to the porous carriers, a volume of micro pores (micro pore volume) having a radius of from 200 to 2000 Å is preferably 0.3 cc/g or more, more preferably 0.4 cc/g or more, and the volume defined above occupies preferably 35% or more, more preferably 40% or more, of that of micro pores having a radius of from 35 to 75000 Å. It is not recommendable to use porous carriers having too small micro pore volume, because the catalyst component may not be fixed effectively. Meanwhile, even if the micro pore volume is 0.3 cc/g or more, a catalyst component may not be fixed effectively unless such a micro pore volume is that of micro pores having a micro pore radius of from 200 to 2000 Å.

The reduction reaction of the titanium compound (2) with the organomagnesium compound (3) can be carried out by adding the organomagnesium compound (3) dropwise to a mixture of the titanium compound (2) and the organosilicon compound (1), or vice versa. In these cases, the reaction may be carried out in the presence of the porous carrier (4).

The titanium compound (2) and the organosilicon compound (1) are preferably dissolved or diluted in a suitable solvent and then used for the reduction reaction. Examples of the solvents are aliphatic hydrocarbons such as hexane, heptane, octane and decane, aromatic hydrocarbons such as toluene and xylene, alicyclic hydrocarbons such as cyclohexane, methylcyclohexane and decalin, and ether compounds such as diethyl ether, dibutyl ether, di-i-amyl ether and tetrahydrofuran.

A reduction temperature is usually from about −50 to 70° C., preferably from about −30 to 50° C., more preferably from about −25 to 35° C.

A time for the dropwise addition is not particularly restricted, but is usually from about 30 minutes to 6 hours. After completion of the reduction reaction, the reaction mixture may be subjected to post reaction at a temperature of from about 20 to 120° C.

The amount of the organosilicon compound (1) to be used is usually within a range of from about 1 to 500, preferably from about 1 to 300, more preferably from about 3 to 100 in terms of an atomic ratio Si/Ti, i.e. a ratio of a silicon atom in the silicon compound (1) to a titanium atom in the titanium compound (2).

The amount of the organomagnesium compound (3) to be used is usually within a range of from about 0.1 to 10, preferably from about 0.2 to 5.0, more preferably from about 0.5 to 2.0 in terms of an atomic ratio (Ti+Si)/Mg, i.e. a ratio of the sum of a titanium atom and a silicon atom to a magnesium atom.

Alternatively, the amounts of the titanium compound (2), the organosilicon compound (1) and the organomagnesium compound (3) may be determined so as to make a molar ratio of Mg/Ti in the solid catalyst component (I) or (I') within a range of about 1 to 51, preferably about 2 to 31, more preferably about 4 to 26.

The solid product obtained by the reduction reaction is separated from the reaction mixture, and washed several times with an inert hydrocarbon solvent such as hexane and heptane.

The thus obtained solid catalyst component precursor (C) contains a trivalent titanium atom, a magnesium atom and a hydrocarbyloxy group, and in general has an amorphous structure or an extremely low crystallinity. Those having the amorphous structure are particularly preferred from a viewpoint of catalyst performance.

As the Ti-halogen bond-carrying compound (D) used in the present invention, titanium compounds having at least one Ti-halogen bond are preferred. Examples thereof are titanium halides, halogenotitanium alkoxides and halogenotitanium amides. Of these, titanium tetrachloride is particularly preferred from a viewpoint of polymerization activity.

In the present invention, the solid catalyst component (I) is obtained by contacting the solid catalyst component precursor (C) with the halogeno compound (A) of the 13 (IIIa) or 14 (IVa) group of elements and the electron donor (B).

The solid catalyst component (I') is obtained by contacting the solid catalyst component precursor (C) with the halogeno compound (A') of the 14 (IVa) group of elements and the electron donor (B) to produce an intermediate product, and then contacting the resulting intermediate product with the Ti-halogen bond-carrying compound (D).

The treatment of the solid catalyst component precursor (C) with the halogeno compound (A) of the 13 (IIIa) or 14 (IVa) group of elements or the halogeno compound (A') of the 14 (IVa) group of elements and the electron donor (B) to contact with one another can be carried out in any known manner, such as a slurry method and a mechanical pulverizing means using a ball mill. However, the mechanical pulverizing means is not preferred from an industrial point of view, because a large amount of fine particles is produced, thereby making the particle size distribution wide. Thus, it is recommendable to treat them in the presence of a diluent.

After completion of the treatment, the resulting mixture can be treated successively as it is. However, it is recommendable to wash the resulting product with a diluent several times, thereby removing unreacted materials.

The diluent is preferably inert to the materials to be treated. Examples thereof are aliphatic hydrocarbons such as pentane, hexane, heptane and octane, aromatic hydrocarbons such as benzene, toluene and xylene, alicyclic hydrocarbons such as cyclohexane and cyclopentane, and halogenated hydrocarbons such as 1,2-dichloroethane and monochlorobenzene.

The amount to be used of the diluent is usually from about 0.1 ml to 1000 ml, preferably from about 1 ml to 100 ml, per g of the solid catalyst component precursor (C).

The treatment and washing can be carried out usually at a temperature of from about −50 to 150° C., preferably from about 0 to 140° C., more preferably from about 60 to 135° C. Although a time for the treatment is not particularly restricted, it is preferably from about 0.5 to 8 hours, more preferably from about 1 to 6 hours, and also, although a time for the washing is not particularly restricted, it is preferably from about 1 to 120 minutes, more preferably from about 2 to 60 minutes.

In carrying out the contacting treatment of the solid catalyst component precursor (C) with the halogeno compound (A) of the 13 (IIIa) or 14 (IVa) group of elements or the halogeno compound (A') of the 14 (IVa) group of elements and the electron donor (B), the method for the contacting treatment is not limited. (A) or (A'), (B) and (C) may be contacted simultaneously, or they may be contacted one by one. The contacting treatment method includes, for example, following methods:

a mixture of (A) or (A') and (B) prepared in advance is added to (C), (C) is added to a mixture of (A) or (A') and (B) prepared in advance, (A) or (A') and (B) are added one by one to (C), (A) or (A') and (B) are added simultaneously to (C), after contacting (C) with (A) or (A') and washing the contacted product, (B) is contacted with the washing product, after contacting (C) with (B) and washing the contacted product, (A) or (A') is contacted with the washing product. Among them, it is preferable to contact (A) or (A'), (B) and (C) simultaneously.

The halogeno compound (A) of the 13 (IIIa) or 14 (IVa) group of elements or the halogeno compound (A') of the 14 (IVa) group of elements is used in an amount of usually from about 0.1 to 1000 mmol, preferably from about 0.3 to 500 mmol, more preferably from about 0.5 to 300 mmol, per g of the solid catalyst component precursor (C).

The total amount of the halogeno compound (A) or (A') may be used for the treatment at one stroke, or the amount thereof to be used may be optionally divided into several parts. For example, the solid catalyst component precursor (C) may be treated with a part of the halogeno compound (A) or (A') and the electron donor (B), followed by treatment with the remaining halogeno compound (A) or (A').

The electron donor (B) is used in an amount of usually from about 0.1 to 1000 mmol, preferably from about 0.3 to 500 mmol, more preferably from about 0.5 to 300 mmol, per g of the solid catalyst component precursor (C). The total amount of the electron donor (B) may be used for the treatment at one stroke, or the amount thereof to be used may be optionally divided into several parts.

A molar ratio of the electron donor (B) to the halogeno compound (A) or (A') in the treatment is preferably from about 0.01 to 200, more preferably from about 0.1 to 100.

According to the process described above, the solid catalyst component (I) or the intermediate product for the solid catalyst component (I') can be produced.

The successive treatment of the intermediate product with the Ti-halogen bond-carrying compound (D) can be carried out in any known manner, such as a slurry method and a mechanical pulverizing means using a ball mill, like in the treatment of the precursor (C) with the halogeno compound (A) or (A') and the electron donor (B). However, the mechanical pulverizing means is not preferred from an industrial point of view, because a large amount of fine particles is produced, thereby making the particle size distribution wide. Thus, it is recommendable to treat them in the presence of a diluent. Such a treatment using a diluent can be carried out in a manner similar to that described above.

In carrying out the contacting treatment, the intermediate product obtained by the treatment of the solid catalyst component precursor (C) with the halogeno compound (A') and the electron donor (B) is added to the Ti-halogen bond-carrying compound (D), or vice versa.

The Ti-halogen bond-carrying compound (D) is used in an amount of usually from 0.1 to 1000 mmol, preferably from 0.3 to 500 mmol, more preferably from 0.5 to 300 mmol, per g of the solid catalyst component precursor (C). The total amount of the compound (D) may be used for the treatment at one stroke, or the amount thereof to be used may be optionally divided into several parts.

The solid catalyst component (I") for olefin polymerization according to the present invention comprises a magnesium atom, a titanium atom, a halogen atom and an electron donor. Use of the solid catalyst component in combination with a co-catalyst component such as an organoaluminum compound gives olefin polymers which are particularly low in their content of Lower molecular weight components. A relative surface area measured by BET method of the solid catalyst component is 30 m$^2$/g or less, preferably 0.01–20 m$^2$/g, more preferably 0.1–15 m$^2$/g.

The content of the electron donor in the solid catalyst component (I") is preferably about 11 wt % or more, more preferably about 13–50 wt %. A content of the lower molecular weight components in olefin polymers decreases with the increase of a content of the electron donor in the solid catalyst component (I"). As the electron donor, organic acid esters are preferable, and among them, dialkyl esters of phthalic acid are particularly preferable.

The solid catalyst component (I") is preferable for the production of an ethylene-α-olefin copolymer, and particularly preferable for an ethylene based copolymer as mentioned hereinafter.

The solid catalyst component (I") includes the solid catalyst component (I) or (I') which satisfies the above characteristics such as the relative surface area of the solid catalyst component (I").

The solid catalyst component (I") can be preferably prepared by contacting simultaneously the halogeno compound (A) of the 13 (IIIa) or 14 (IVa) group of elements or the halogeno compound (A') of the 14 (IVa) group of elements, the electron donor (B) and the solid catalyst component precursor (C). As the electron donor (B), organic acid esters are preferable, and among them, dialkyl esters of phthalic acid are particularly preferable.

The solid catalyst component (I), (I') or (I") can be used for polymerization in the form of a slurry in the presence of the diluent, or in the form of a flowable powder after drying the resulting product in a suitable manner.

[Catalyst for Olefin Polymerization]

The catalyst for olefin polymerization used in the present invention is one comprising the solid catalyst component (I), (I') or (I") and an organoaluminum compound (II).

The organoaluminum compound (II) has at least one Al-carbon bond in the molecule. Examples thereof are those represented by the following formulas, $$R^{12}{}_r AlY_{3-r}$$

$$R^{13}R^{14}Al—(O—AlR^{15})_d R^{16}$$

wherein $R^{12}$, $R^{13}$, $R^{14}$, $R^{15}$ and $R^{16}$ are independently of one another a hydrocarbon group having 1 to 8 carbon atoms, Y is a halogen atom, a hydrogen atom or an alkoxy group, r is a number satisfying $2 \leq r \leq 3$, and d is a number satisfying $1 \leq d \leq 30$.

Specific examples of the organoaluminum compound (II) are trialkylaluminums such as triethylaluminum, tri-n-butylaluminum, tri-i-bulylaluminum and trihexylaluminum, dialkylaluminum hydrides such as diethylaluninum hydride, di-n-butylaluminum hydride and di-i-butylaluminum hydride, alkylaluminum dihaliides such as ethylaluminium dichloride, n-butlylaluminium dichioride and i-butylaluminium dichioride, dialkylaluminum halides such as diethylaluminium chloride, di-n-butlylaluminium chloride and di-i-butlylaluminium chloride, mixtures of trialkylaluminums and dialkylaluminum halides, and alkylalumoxanes such as tetraethyldialumoxane, tetrabutyldialumoxane, polymethylalumoxane and polyethylalumoxane.

Among these organoaluminum compounds, trialkylaluminums, mixtures of trialkylaluminums and dialkylaluminum halides and alkylalumoxanes are preferred. Triethylaluminum, tri-n-butylaluminum, tri-i-butylaluminum, trihexylaluminum, a mixture of triethylaluminum and diethylaluminum chloride, and tetraethyldialumoxane are particularly preferred.

The amount to be used of the organoaluminum compound (II) is usually within a wide range such as from 1 to 1000 mol, preferably from 5 to 600 mol, per mol of a titanium atom in the solid catalyst component (I), (I') or (I").

[Pre-polymerization]

The solid catalyst component (I), (I') or (I") in the present invention can be used in the olefin polymerization as it is. Alternatively, the catalyst component can be subjected to pre-polymerization treatment and then used for the olefin polymerization. The pre-polymerization can be carried out by contacting the solid catalyst component and the organoaluminum compound (II) with an olefin. As the olefin used for the pre-polymerization, ethylene, propylene and butene-1 are exemplified. The pre-polymerization can be any of homopolymerization and copolymerization.

In order to obtain a pre-polymer (pre-polymerization product) having a high crystallinity, the pre-polymerization may be carried out in the presence of a known electron donor or hydrogen. As the electron donor, an organic compounds having an Si—OR bond, wherein R is a hydrocarbon group having 1 to 20 carbon atoms, is preferably used.

In carrying out the pre-polymerization of the solid catalyst component, it is recommendable to use the solid catalyst component in a slurry form. Examples of solvents used for the slurry are aliphatic hydrocarbons such as butane, pentane, hexane and heptane, and aromatic hydrocarbons such as toluene and xylene.

A concentration of the slurry is usually from 0.001 to 0.5 g-solid/ml-solvent, preferably from 0.01 to 0.3 g-solid/ml-solvent. The organoaluminum compound is used preferably in an amount of from 0.1 to 100, more preferably from 1 to 10, in terms of an atomic ratio of Al/Ti.

The pre-polymerization treatment is carried out usually at a temperature of from −30 to 80° C., preferably from −10 to 50° C.

The amount of the pre-polymer is usually from 0.1 to 100 g, preferably from 0.5 to 50 g, per g of the solid catalyst component.

[Process for Producing Olefin Polymer]

In accordance with the present invention, one or more olefins can be subjected to polymerization using the solid catalyst component pre-polymerized, or not, and the organoaluminum compound. The polymerization is explained in detail as follows.

The solid catalyst component and the organoaluminum compound can be fed into a polymerization reaction vessel in any manner which is not particularly restricted as far as they are fed under a moisture-free condition by using a carrier gas, for example, an inert gas (such as nitrogen or argon) or hydrogen or an olefin. The solid catalyst component and the organoaluminum compound can be fed separately or can be contacted with each other in advance.

The polymerization reaction can be carried out in any known manner including usual gas-phase polymerization and slurry polymerization. It is recommendable to carry out the polymerization usually under conditions of a temperature lower than that, at which the polymer is melted, preferably from about 20 to 100° C., more preferably from about 40 to 90° C., and a pressure of from atmospheric pressure to 40 kg/cm$^2$. In order to control a melt flowability of the polymer obtained, hydrogen may be added to the polymerization system as a molecular weight controller. The polymerization can be carried out continuously or in a batch-wise manner.

Examples of the olefins used for the production of the olefin polymer are those having two or more carbon atoms. Specific examples thereof are ethylene, propylene, butene-1, pentene-1, hexene-1, 3-methyl-pentene-1 and 4-methylpentene-1.

According to the process of the present invention, homopolymerization of an olefin and copolymerization of two or more olefins can be effectively carried out. In the present invention, copolymerization of ethylene with another α-olefin is preferably carried out to obtain a desired copolymer, particularly an ethylene based copolymer substantially having a crystalline structure. In this copolymerization, ethylene and one or more α-olefins are used in a mixture form to obtain a desired ethylene based copolymer.

In accordance with the present invention, there can be provided a solid catalyst component for olefin polymerization, which is extremely superior in particle form, and a catalyst for olefin polymerization, which is high in polymerization activity, so that after the polymerization no removal of a catalyst residue is needed, and further a process for producing an olefin polymer that is superior in powder properties and low in a content of lower molecular weight components.

The present invention is explained in more detail with reference to the following Examples, which are only illustrative and not intended to limit the scope of the present invention.

The properties of solids such as polymers and solid components such as solid catalyst components in Examples were measured in the following manners.

(1) Content of an α-olefin

Using an infrared spectrophotometer, characteristic absorptions of ethylene and the α-olefin were measured to prepare a calibration curve. The content of α-olefin was determined using the calibration curve and shown in terms of a short chain branch number (SCB) per 1000 C.

(2) Flow Rate (FR)

Measured at 190° C. according to ASTM D1238.

(3) Flow Rate Ratio (FRR) which was Adopted as a Measure for a Melt Fluidity.

FRR was shown in terms of a ratio of respective flow rakes (FR) obtained according to said measuring method (2), wherein the load applied was 21.60 kg and 2.160 kg, namely, $FRR$=(flow rate when the load was 21.60 kg)÷(flow rate when the load was 2.160 kg).

It is known that FRR value increases with increase of the molecular weight distribution of a polymer.

(4) Content of Lower Molecular Weight Components

Shown in terms of a quantity of the extract with a cold xylene of 25° C. (CXS).

(5) Composition Analysis

Mg content: after decomposing a solid component with a dilute sulfuric acid, measured by ICP emission analysis using a Optima 3000 manufactured by Perkin Elmer Ltd.

Ti content: after decomposing a solid component with a dilute sulfuric acid and then adding an excess hydrogen peroxide aqueous solution, a characteristic absorption at 410 nm was measured by a double-beam spectrophotometer U-2001 manufactured by Hitachi Co., Ltd. and Ti content was determined using the calibration curve.

Cl content: after decomposing a solid component with water, Cl content was measured by a precipitation titration method using silver nitrate.

Alkoxyl group content: after decomposing a solid component with water, the content of the resultant corresponding alcohol in the decomposed material was measured by a gas chromatography (internal standard method). Then, based on the alcohol content, the alkoxyl group content was calculated.

Electron donor content: after decomposing a solid component with water, soluble components were extracted by a saturated hydrocarbon solvent, and the extract including an electron donor was analyzed by gas chromatography (internal standard method). In case of using an ester as an electron donor, all of the electron donor included in the solid component and analyzed by this method was not identical with that initially used, because some of the alkyl groups of the electron donor initially used were substituted with other alkyls during the production process of the solid component. Therefore, the electron donor content analyzed by this method includes the contents of the electron donor initially used and that substituted with other alkyls.

(6) Relative Surface Area

Relative surface area of a solid catalyst component was measured by a BET method (nitrogen gas) using Flow Sorb II 2300 manufactured by Micromeritics.

EXAMPLE 1

(1) Preparation of Solid Catalyst Component Precursor

A 500 ml flask equipped with a stirrer and a dropping funnel was purged with nitrogen, and 160 ml of hexane, 44 ml (196.4 mol) of tetraethoxysilane and 4.4 ml (12.9 mol) of tetrabutoxytitanium were fed therein. The mixture was stirred at 30° C. for 30 minutes.

Then, 100 ml of a 2.1 mol/l dibutyl ether solution of butylmagnesium chloride was added dropwise to the mixture over 1 hour while maintaining a temperature of the flask at 5° C. After completion of the addition, the mixture was stirred at 5° C. for 1 hour, and additionally stirred for 1 hour at 20° C. Thereafter, a solid product was separated by filtration, washed 3 times with 200 ml of hexane and dried under a reduced pressure to obtain 31.2 g of a brown solid catalyst component precursor.

The solid catalyst component precursor was found to contain Mg: 16.5 wt %, Ti: 1.91 wt %, OEt(ethoxy group): 36.4 wt % and OBu(butoxy group): 2.93 wt %.

(2) Production of Solid Catalyst Component

A 50 ml flask equipped with a stirrer and a dropping funnel was purged with nitrogen, and 17.5 ml of toluene, 5.1 ml (31.9 mmol) of phenyltrichlorosilane (as the case may be, abbreviated as PhTCS) and 4.3 ml (16.0 mmol) of di-i-butyl phthalate (as the case may be, abbreviated as DIBP) were fed therein. The mixture was stirred at 70° C. for 1 hour.

A 100 ml flask equipped with a stirrer and a dropping funnel was purged with nitrogen, and 17.5 ml of toluene and 7.00 g of the solid catalyst component precursor prepared in the above (1) were fed therein. The mixture was kept at 70° C. for 30 minutes, and then, the whole mixture of PhTCS and DIBP prepared above was added thereto. The resulting mixture was stirred for 3 hours at 95° C. Thereafter, a solid product was separated by filtration from the mixture, and washed 3 times with 35 ml of toluene at 95° C. To the solid washed was added 35 ml of toluene, and after raising the temperature to 70° C., 5.1 ml (31.9 mmol) of PhTCS was added thereto. The mixture was stirred for 1 hour at 95° C. Thereafter, like the above, a solid product was separated by filtration from the mixture, washed 7 times with 35 ml of toluene at 95° C., further washed 2 times with 35 ml of hexane at room temperature, and dried under a reduced pressure to obtain a solid catalyst component superior in a particle form. The solid catalyst component was found to have a Ti consent of 1.29 wt %, an electron donor content of 17.1 wt % and a relative surface area of 14 $m^2/g$.

(3) Polymerization

A 3 liter autoclave equipped with a stirrer was dried thoroughly, and made vacuum. Then, 1.2 $kg/cm^2$ of hydrogen, 600 g of butane and 150 g of butene-1 were fed into the autoclave, and heated to 70° C. Ethylene was fed therein to make a partial pressure 6.0 $kg/cm^2$. Successively, 14.2 mg of the solid catalyst component obtained in the above (2) and 5.7 mmol of triethylaluminum were fed therein under a pressure of argon to initiate polymerization. The polymerization was continued for 3 hours at 70° C., while maintaining a total pressure to a fixed degree by continuous feeding of ethylene.

After completion of the polymerization, unreacted monomers were purged to obtain 71 g of a polymer superior in powder properties. There was observed almost no polymer adhering to the inner wall of the autoclave and the stirrer.

The polymer production per catalyst (polymerization activity) was found to be 1670 g-polymer/g-solid catalyst component/hr, and the resulting polymer was found to have SCB: 17.7, FR: 1.74, FRR: 29.5 and CXS: 7.5 wt %, which results demonstrate that the content of lower molecular weight components therein is low.

EXAMPLE 2

(1) Production of Solid Catalyst Component

Example 1(2) was repeated, except that 4.8 ml (31.9 mmol) of n-propyltrichlorosilane (abbreviated as nPTCS) was used in place of PhTCS, thereby obtaining a solid catalyst component superior in a particle form. The solid catalyst component was found to have a Ti content of 1.32 wt %.

(2) Polymerization

Using 25.8 mg of the solid catalyst component obtained in the above (1), Example 1(3) was repeated to obtain 105 g of a polymer superior in powder properties. There was observed almost no polymer adhering to the inner wall of the autoclave and the stirrer.

The polymer production per catalyst (polymerization activity) was found to be 1360 g-polymer/g-solid catalyst component/hr, and the resulting polymer was found to have SCB: 15.5, FR: 1.40, FRR: 30.4 and CXS: 7.1 wt %, which results demonstrate that the content of lower molecular weight components therein is low.

EXAMPLE 3

(1) Production of Solid Catalyst Component

Using 1.9 ml (4.8 mmol) of di(2-ethylhexyl) phthalate (abbreviated as DEHP) in place of DIBP, Example 1(2) was repeated to obtain a solid catalyst component superior in a particle form. The solid catalyst component was found to have a Ti content of 1.48 wt %, an electron donor content of 15.8 wt % and a relative surface area of 1.1 $m^2/g$.

(2) Polymerization

Using 22.0 mg of the solid catalyst component obtained in the above (1), Example 1(3) was repeated to obtain 90.8 g of a polymer superior in powder properties. There was observed almost no polymer adhering to the inner wall of the autoclave and the stirrer.

The polymer production per catalyst (polymerization activity) was found to be 1377 g-polymer/g-solid catalyst component/hr, and the resulting polymer was found to have SCB: 15.4, FR: 1.84, FRR: 26.2 and CXS: 7.4 wt %, which results demonstrate that the content of lower molecular weight components therein is low.

EXAMPLE 4

(1) Production of Solid Catalyst Component

A 100 ml flask equipped with a stirrer was purged with nitrogen, and 7.00 g of the solid catalyst component precursor (C) prepared in Example 1(1), 35 ml of toluene, 5.1 ml (31.9 mmol) of PhTCS and 4.3 ml (16.0 mmol) of DIBP were fed therein. The mixture was stirred for 2 hours at 105° C. Thereafter, a solid product was separated by filtration from the mixture, and washed 4 times with 35 ml of toluene at 105° C. To the solid washed was added 35 ml of toluene; and after raising the temperature to 70° C., 5.1 ml (31.9 mmol) of PhTCS and 2.1 ml (8.0 mmol) of DIBP were added thereto. The mixture was stirred for 2 hours at 105° C. Thereafter, a solid product was separated by filtration from the mixture, washed 4 times with 35 ml of toluene at 105° C., further washed 2 times with 35 ml of hexane at room temperature, and dried under a reduced pressure to obtain a solid catalyst component superior in a particle form. The solid catalyst component was found to have a Ti content of 1.19 wt %.

(2) Polymerization

Using 15.3 mg of the solid catalyst component obtained in the above (1), Example 1(3) was repeated to obtain 32 g of a polymer superior in powder properties. There was observed almost no polymer adhering to the inner wall of the autoclave and the stirrer.

The polymer production per catalyst (polymerization activity) was found to be 700 g-polymer/g-solid catalyst component/hr, and the resulting polymer was found to have SCB: 18.3, FR: 1.08, ERR: 25.4 and CXS: 8.1 wt %, which results demonstrate that the content of lower molecular weight components therein is low.

EXAMPLE 5

(1) Preparation of Solid Catalyst Component Precursor

A 300 ml flask equipped with a stirrer and a dropping funnel was purged with nitrogen, and 26.1 g of styrene-divinylbenzene copolymer having an average particle size of 37 μm and a micro pore volume of 1.05 cc/g within a micro pore radius range of 100 to 5000 Å, which had been dried at 80° C. for 5 hours, 123 ml of toluene, 11.4 ml (228 mmol) of tetraethoxysilane and 7.9 ml (23.2 mol) of tetrabutoxytitanium were fed therein. The mixture was stirred for 45 minutes at room temperature.

Then, 35.5 ml of a 2.1 mol/l dibutyl ether solution of butylmagnesium chloride was added dropwise to she mixture over 1 hour while maintaining the temperature of the flask at 5° C. After completion of the addition, the mixture was stirred at 5° C. for 0.5 hour, and additionally stirred for 3 hours at room temperature. Thereafter, a solid product was separated by filtration, washed 3 times with 125 ml of toluene, further washed 2 times with 125 ml of hexane, and dried under a reduced pressure to obtain 37.2 g of a brown solid catalyst component precursor.

The solid catalyst component precursor was found to contain Mg: 4.60 wt %, Ti: 2.42 wt %, OEt: 10.06 wt % and OBu: 5.73 wt %.

(2) Production of Solid Catalyst Component

A 100 ml flask equipped with a stirrer and a dropping funnel was purged with nitrogen, and 7.0 g of the solid catalyst component precursor prepared in the above (1), 35 ml of toluene, 1.5 ml (9.58 mmol) of PhTCS and 2.6 ml (4.79 mmol) of DIBP were fed therein. The mixture was stirred at 105° C. for 2 hours. The mixture stirred was filtered to obtain a solid product, which was then washed 4 times with 35 ml of toluene at 105° C. To the solid washed was added 35 ml of toluene, and after raising the temperature to 70° C., 1.5 ml (9.58 mmol) of PhTCS was added thereto. The mixture was stirred for 2 hours at 105° C. Thereafter, a solid product was separated by filtration from the mixture, washed 4 times with 35 ml of toluene at 105° C., further washed 2 times with 35 ml of hexane at a room temperature, and dried under reduced pressure to obtain a solid catalyst component superior in a particle form. The solid catalyst component was found to have a Ti content of 1.85 wt %.

(3) Polymerization

Using 30.4 mg of the solid catalyst component obtained in the above (2), Example 1(3) was repeated, provided that the amounts of butane and butene-1 were changed to 620 g and 130 g, respectively, thereby obtaining 97 g of a polymer superior in powder properties. There was observed almost no polymer adhering to the inner wall of the autoclave and the stirrer.

The polymer production per catalyst (polymerization activity) was found to be 1060 g-polymer/g-solid catalyst component/hr, and the resulting polymer was found to have SCB: 17.3, FR: 1.57, FRR: 27.3 and CXS: 8.4 wt %, which results demonstrate that the content of lower molecular weight components therein is low.

EXAMPLE 6

(1) Production of Solid Catalyst Component

A 500 ml flask equipped with a stirrer and a dropping funnel was purged with nitrogen, and 51.6 g of the solid catalyst component precursor prepared in the same manner as in Example 1(1), and 130 ml of toluene were fed therein. A mixture of 5.16 ml (30.3 mmol) of di-n-butyl ether and 113.5 ml (0.970 mol) of tin tetrachloride placed in the dropping funnel was added dropwise into the flask. The mixture was stirred for 3 hours at 112° C. Thereafter, a solid product was separated by filtration from the mixture, washed 4 times with 260 ml of toluene at 112° C., further washed 3 times with 260 ml of hexane at a room temperature, and then dried under a reduced pressure to obtain a solid catalyst component superior in a particle form. The solid catalyst component was found to have a Ti content of 0.21 wt %.

(2) Polymerization

Using 24.2 mg of the solid catalyst component obtained in the above (1), Example 1(3) was repeated, except that the amounts of butane and butene-1 and the hydrogen pressure were changed to 610 g, 140 g and 1.0 kg/cm$^2$, respectively, thereby obtaining 42.1 g of a polymer superior in powder properties. There was observed almost no polymer adhering to the inner wall of the autoclave and the stirrer.

The polymer production per catalyst (polymerization activity) was found to be 580 g-polymer/g-solid catalyst component/hr, and the resulting polymer was found to have SCB: 15.6, FR: 0.46, FRR: 30.2 and CXS: 5.6 wt %, which results demonstrate that the content of lower molecular weight components therein is low.

EXAMPLE 7

(1) Production of Solid Catalyst Component

A 100 ml flask equipped with a stirrer and a dropping funnel was purged with nitrogen, and 5.0 g of the solid catalyst component precursor prepared in Example 5(1), and 30 ml of toluene were fed therein. The temperature was raised to 95° C., and then, 8.7 ml (30 mmol) of a 3.46 mmol/cc hexane solution of ethyldichloroaluminum was added thereto. The mixture was stirred for 2 hours at 95° C. Thereafter, a solid product was separated by filtration from the mixture, and washed 2 times with 30 ml of toluene at 95° C. To the solid product washed was added 30 ml of toluene. After raising the temperature to 95° C., 0.35 ml (0.75 mmol) of di-i-decyl phthalate was added thereto, and the mixture was stirred for 1 hour at 95° C. A solid product was separated by filtration, washed 2 times with 30 ml of toluene at 95° C., further washed 2 times with 30 ml of hexane at a room temperature, and then dried under a reduced pressure to obtain a solid catalyst component superior in a particle form. The solid catalyst component was found to have a Ti content of 0.38 wt %.

(2) Polymerization

Using 53.1 mg of the solid catalyst component obtained in the above (1), Example 1(3) was repeated, except that the hydrogen pressure, the amounts of butane, butene-1 and triethylaluminum, and polymerization time were changed to 1.0 kg/cm$^2$, 610 g, 140 g and 3.0 mmol, and 2 hours, respectively, thereby obtaining 69 g of a polymer superior in powder properties. There was observed almost no polymer adhering to the inner wall of the autoclave and the stirrer.

The polymer production per catalyst (polymerization activity) was found to be 650 g-polymer/g-solid catalyst component/hr, and the resulting polymer was found to have SCB: 19.4, FR: 0.37, FRR: 29.7 and CXS: 10.0 wt %, which results demonstrate that the content of lower molecular weight components therein is low.

COMPARATIVE EXAMPLE 1

(1) Production of Solid Catalyst Component

In a 500 ml flask equipped with a stirrer, 175 ml of a 1.27 mol Mg/l heptane solution of butylethylmagnesium was fed, and 75 g of tetrachlorosilane was added dropwise thereto at room temperature. After completion of the addition, the mixture was stirred at 60° C. for 2 hours, and a solid product separated from the mixture by filtration was washed 7 times with 100 ml of heptane, and dried under reduced pressure to obtain 18.0 g of a white solid product.

The obtained solid product in an amount of 1.82 g was fed in a 200 ml flask equipped with a stirrer, and 94 ml of heptane was added thereto to form a slurry. To the slurry was added 0.95 ml of titanium tetrachloride at room temperature, and the resulting mixture was stirred for 1 hour at 90° C. A solid product separated from the mixture by filtration was washed 5 times with 94 ml of heptane, and dried under reduced pressure to obtain 1.66 g of a solid product. The solid product was found to have a Ti content of 6.30 wt %, an electron donor content of 0 wt % and a relative surface area of 75 m$^2$/g.

(2) Polymerization

A 3 liter autoclave equipped with a stirred was dried thoroughly, and made vacuum. Then, 1.0 kg/cm$^2$ of hydrogen, 650 g of butane and 100 g of butene-1 were fed into the autoclave, and heated to 70° C. Ethylene was fed therein to make a partial pressure 6.0 kg/cm$^2$. Successively, 5.7 mmol of triethylaluminum and 14.2 mg of the solid catalyst component obtained in the above (1) were fed therein under a pressure of argon to initiate polymerization. The polymerization was continued for 2 hours at 70° C., while maintaining a total pressure to a fixed degree by continuous feeding of ethylene. After completion of the polymerization, unreacted monomers were purged to obtain 136 g of a polymer.

The polymer production per catalyst (polymerization activity) was found to be 4790 g-polymer/g-solid catalyst component/hr, and the resulting polymer was found to have SCB: 11.5, FR: 0.56, FRR: 34.6 and CXS: 5.1 wt %, which results demonstrate that taking the α-olefin content (SCB) into consideration, the CXS value is high.

COMPARATIVE EXAMPLE 2

Using 11.4 mg of the solid catalyst component obtained in Comparative Example 1(1), Comparative Example 1(2) was repeated, except that the amounts of butane and butene-1 were changed to 630 g and 120 g, respectively, thereby obtaining 119 g of a polymer.

The polymer production per catalyst (polymerization activity) was found to be 5220 g-polymer/g-solid catalyst component/hr, and the resulting polymer was found to have SCB: 16.3, FR: 0.83, FRR: 34.4 and CXS: 9.0 wt %, which results demonstrate that taking the α-olefin content (SCB) into consideration, the CXS value is high.

COMPARATIVE EXAMPLE 3

Using 8.0 mg of the solid catalyst component obtained in Comparative Example 1(1), Comparative Example 1(2) was repeated, except that the amounts of butane and butene-1 were changed to 610 g and 140 g, respectively, thereby obtaining 87 g of a polymer.

The polymer production per catalyst (polymerization activity) was found to be 5440 g-polymer/g-solid catalyst component/hr, and the resulting polymer was found to have SCB: 18.7, FR: 0.86, FRR: 34.0 and CXS: 10.9 wt %, which results demonstrate that taking the α-olefin content (SCB) into consideration, the CXS value is high.

COMPARATIVE EXAMPLE 4

(1) Production of Solid Catalyst Component

A 500 ml flask equipped with a stirrer and a dropping funnel was purged with nitrogen, and 346 ml of toluene and 67.2 g of the solid catalyst component precursor which had been prepared in the same manner as in Example 1(1) were fed therein. The temperature was raised to 95° C., and then, 45 ml (168 mmol) of DIBP was added thereto. The mixture was stirred for 30 minutes. Thereafter, a solid product was separated by filtration from the mixture, and washed 2 times with 340 ml of toluene at 95° C. To the solid product washed was added 87 ml of toluene. Successively, a mixture of 6.7 ml (39.3 mmol) of dibutyl ether, 3.8 ml (14.2 mmol) of DIBP and 134.4 ml (1.23 mol) of TiCl$_4$ was added thereto, and the mixture was stirred at 95° C. for 3 hours. A solid product was separated by filtration from the mixture, and washed 2 times with 340 ml of toluene at 95° C. To the solid product washed was added 68 ml of toluene, and a mixture of 6.7 ml (39.3 mmol) of dibutyl ether and 67.2 ml (612 mmol) of TiCl$_4$ was further added thereto. The mixture was stirred for 3 hours at 95° C. Thereafter, a solid product was separated from the mixture by filtration, washed 3 times with 340 ml of toluene at 95° C., further washed 2 times with 340 ml of hexane at room temperature, and then dried under a reduced pressure to obtain a solid catalyst component. The solid catalyst component was found to have a Ti content of 1.8 wt %, an electron donor content of 10.1 wt % and a relative surface area of 250 m$^2$/g.

(2) Polymerization

Using 9.8 mg of the solid catalyst component obtained in the above (1), Example 1(3) was repeated, except that the hydrogen pressure and the amounts of butane and butene-1 were changed to 660 mmHg, and 600 g and 100 g, respectively, thereby obtaining 103 g of a polymer.

The polymer production per catalyst (polymerization activity) was found to be 3500 g-polymer/g-solid catalyst component/hr, and the resulting polymer was found to have SCB: 20.8, FR: 0.98, FRR: 27.0 and CXS: 12.9 wt %, which results demonstrate that taking the α-olefin content (SCB) into consideration, the CXS value is high.

EXAMPLE 8

(1) Production of Solid Catalyst Component

A 100 ml flask equipped with a stirrer and a dropping funnel was purged with nitrogen, and 7.0 g of the solid catalyst component precursor prepared in the same manner as in Example 1(1), 35 ml of toluene, 5.1 ml (31.9 mmol) of phenyltrichlorosilane (abbreviated as $PhSiCl_3$) and 4.3 ml (16.0 mmol) of DIBP were fed therein. The mixture was stirred for 2 hours at 105° C. Thereafter, a solid product was separated by filtration from the mixture, and washed 4 times with 35 ml of toluene at 105° C. To the solid product washed was added 35 ml of toluene. After raising the temperature to 70° C., 3.5 ml (31.9 mmol) of $TiCl_4$ was added thereto, and the mixture was stirred for 2 hours at 105° C. A solid product was separated by filtration, washed 7 times with 35 ml of toluene at 105° C., further washed 2 times with 35 ml of hexane at a room temperature, and then dried under a reduced pressure to obtain a solid catalyst component superior in a particle form. The solid catalyst component was found to have a Ti content of 1.52 wt %, an electron donor content of 24.5 wt % and a relative surface area of 8.5 $m^2/g$.

(2) Polymerization

A 3 liter autoclave equipped with a stirrer was dried thoroughly, and made vacuum. Then, 1.2 $kg/cm^2$ of hydrogen, 620 g of butane and 130 g of butene-1 were fed into the autoclave, and heated to 70° C. Ethylene was fed therein to make a partial pressure 6.0 $kg/cm^2$. Successively, 5.7 mmol of triethylaluminum and 15.8 mg of the solid catalyst component obtained in the above (1) were fed therein under a pressure of argon to initiate polymerization. The polymerization was continued for 3 hours at 70° C., while maintaining total pressure to a fixed degree by continuous feeding of ethylene.

After completion of the polymerization, unreacted monomers were purged to obtain 123 g of a polymer superior in powder properties. There was observed almost no polymer adhering to the inner wall of the autoclave and the stirrer.

The polymer production per catalyst (polymerization activity) was found to be 2590 g-polymer/g-solid catalyst component/hr, and the resulting polymer was found to have SCB: 19.0, FR: 1.07, FRR: 25.1 and CXS: 8.7 wt %, which results demonstrate that the content of lower molecular weight components therein is low.

EXAMPLE 9

(1) Production of Solid Catalyst Component

Example 8(1) was repeated, except that 3.4 ml (12.8 mmol) of di-n-butyl phthalate (as the case maybe, abbreviated as DNBP) as the electron donor was used in place of DIBP, thereby obtaining a solid catalyst component superior in a particle form. The solid catalyst component was found to have a Ti content of 1.27 wt %.

(2) Polymerization

Using 23.0 mg of the solid catalyst component obtained in the above (1), Example 8(2) was repeated to obtain 31.8 g of a polymer superior in powder properties. There was observed almost no polymer adhering to the inner wall of the autoclave and the stirrer.

The polymer production per catalyst (polymerization activity) was found to be 460 g-polymer/g-solid catalyst component/hr, and the resulting polymer was found to have SCB: 12.5, FR: 0.402, FRR: 25.7 and CXS: 2.9 wt %, which results demonstrate that the content of lower molecular weight components therein is low.

EXAMPLE 10

(1) Production of Solid Catalyst Component

Example 8(1) was repeated, except that 6.3 ml (16.0 mmol) of DEHP was used in place of DIBP, thereby obtaining a solid catalyst component superior in a particle form. The solid catalyst component was found to have a Ti content of 1.31 wt %, an electron donor content of 21.0 wt % and a relative surface area of 5.3 $m^2/g$.

(2) Polymerization

Using 16.5 mg of the solid catalyst component obtained in the above (1), Example 8(2) was repeated to obtain 110 g of a polymer superior in powder properties. There was observed almost no polymer adhering to the inner wall of the autoclave and the stirrer.

The polymer production per catalyst (polymerization activity) was found to be 2220 g-polymer/g-solid catalyst component/hr, and the resulting polymer was found to have SCB: 17.0, FR: 0.982, FRR: 24.5 and CXS: 5.9 wt %, which results demonstrate that the content of lower molecular weight components therein is low.

EXAMPLE 11

(1) Production of Solid Catalyst Component

Example 8(1) was repeated, except that 4.5 ml (16.0 mmol) of benzyl-n-butyl phthalate (abbreviated as BNBP) was used in place of DIBP, thereby obtaining a solid catalyst component superior in a particle form. The solid catalyst component was found to have a Ti content of 3.80 wt %.

(2) Polymerization

Using 14.7 mg of the solid catalyst component obtained in the above (1), Example 8(2) was repeated to obtain 38.3 g of a polymer superior in powder properties. There was observed almost no polymer adhering to the inner wall of the autoclave and the stirrer.

The polymer production per catalyst (polymerization activity) was found to be 870 g-polymer/g-solid catalyst component/hr, and the resulting polymer was found to have SCB: 15.7, FR: 1.20, FRR: 26.5 and CXS: 6.5 wt %, which results demonstrate that the content of lower molecular weight components therein is low.

EXAMPLE 12

(1) Production of Solid Catalyst Component

Example 8(1) was repeated, except that 4.8 ml (31.9 mmol) of n-propyltrichlorosilane (abbreviated as $PrSiCl_3$) was used in place of $PhSiCl_3$, thereby obtaining a solid catalyst component superior in a particle form. The solid catalyst component was found to have a Ti content of 1.54 wt %, an electron donor content of 20.0 wt % and a relative surface area of 7.4 $m^2/g$.

(2) Polymerization

Using 12.9 mg of the solid catalyst component obtained in the above (1), Example 8(2) was repeated to obtain 92.2 g of a polymer superior in powder properties. There was observed almost no polymer adhering to the inner wall of the autoclave and the stirrer.

The polymer production per catalyst (polymerization activity) was found to be 2380 g-polymer/g-solid catalyst component/hr, and the resulting polymer was found to have SCB: 17.2, FR: 0.86, FRR: 25.3 and CXS: 6.9 wt %, which results demonstrate that the content of lower molecular weight components therein is low.

EXAMPLE 13

(1) Production of Solid Catalyst Component

Example 8(1) was repeated, except that 5.6 ml (31.9 mmol) of p-tolyltrichlorosilane (as the case may be, abbreviated as TlSiCl$_3$) was used in place of PhSiCl$_3$, thereby obtaining a solid catalyst component superior in a particle form. The solid catalyst component was found to have a Ti content of 1.59 wt %.

(2) Polymerization

Using 13.9 mg of the solid catalyst component obtained in the above (1), Example 8(2) was repeated to obtain 117 g of a polymer superior in powder properties. There was observed almost no polymer adhering to the inner wall of the autoclave and the stirrer.

The polymer production per catalyst (polymerization activity) was found to be 2810 g-polymer/g-solid catalyst component/hr, and the resulting polymer was found to have SCB: 17.5, FR: 1.08, FRR: 25.3 and CXS: 7.3 wt %, which results demonstrate that the content of lower molecular weight components therein is low.

EXAMPLE 14

(1) Preparation of Solid Catalyst Component Precursor

A 300 ml flask equipped with a stirrer and a dropping funnel was purged with nitrogen, and 26.1 g of styrene-divinylbenzene copolymer having an average particle size of 37 μm and a micro pore volume of 1.05 cc/g within a micro pore radius range of 100 to 5000 Å, which had been dried at 80° C. for 5 hours, 123 ml of toluene, 11.4 ml (228 mmol) of tetraethoxysilane and 7.9 ml (23.2 mol) of tetrabutoxytitanium were fed therein. The mixture was stirred for 45 minutes at a room temperature.

Then, 35.5 ml of a 2.1 mol/l dibutyl ether solution of butylmagnesium chloride was added dropwise to the mixture over 1 hour while maintaining the temperature of the flask at 5° C. After completion of the addition, the mixture was stirred at 5° C. for 0.5 hour, and additionally stirred for 3 hours at a room temperature. Thereafter, a solid product was separated by filtration from the mixture, washed 3 times with 125 ml of toluene, further washed 2 times with 125 ml of hexane, and dried under a reduced pressure to obtain 37.2 g of a brown solid catalyst component precursor.

The solid catalyst component precursor was found to contain Mg: 4.60 wt %, Ti: 2.42 wt %, OEt: 10.06 wt % and OBu: 5.73 wt %.

(2) Production of Solid Catalyst Component

A 100 ml flask equipped with a stirrer and a dropping funnel was purged with nitrogen, and 7.0 g of the solid catalyst component precursor prepared in the above (1), 35 ml of toluene, 1.5 ml (9.58 mmol) of PhSiCl$_3$ and 1.3 ml (4.79 mmol) of DIBP were fed therein. The mixture was stirred at 105° C. for 2 hours. The mixture stirred was filtered to obtain a solid product, which was then washed 4 times with 35 ml of toluene at 105° C. To the solid washed was added 35 ml of toluene, and after raising the temperature to 70° C., 1.1 ml (9.58 mmol) of TiCl$_4$ was added thereto. The mixture was stirred for 2 hours at 105° C. Thereafter, a solid product was separated by filtration from the mixture, washed 4 times with 35 ml of toluene at 105° C., further washed 2 times with 35 ml of hexane at a room temperature, and dried under a reduced pressure to obtain a solid catalyst component superior in a particle form. The solid catalyst component was found to have a Ti content of 1.01 wt %.

(3) Polymerization

Using 30.7 mg of the solid catalyst component obtained in the above (2), Example 8(2) was repeated to obtain 66 g of a polymer superior in powder properties. There was observed almost no polymer adhering to the inner wall of the autoclave and the stirrer.

The polymer production per catalyst (polymerization activity) was found to be 720 g-polymer/g-solid catalyst component/hr, and the resulting polymer was found to have SCB: 18.5, FR: 1.26, FRR: 25.5 and CXS: 8.5 wt %, which results demonstrate that the content of lower molecular weight components therein is low.

EXAMPLE 15

(1) Production of Solid Catalyst Component

A 400 ml autoclave equipped with a stirrer was purged with nitrogen, and 21 g of the solid catalyst component precursor prepared in the same manner as in Example 1(1), 105 ml of toluene, 11.0 ml (95.7 mmol) of tetrachlosilane (abbreviated as SiCl$_4$) and 12.8 ml (47.9 mmol) of DIBP were fed therein. The mixture was stirred at 120° C. for 2 hours. After cooling the autoclave to a room temperature, the resulting mixture was transferred to a 200 ml flask purged with nitrogen. The mixture stirred was filtered to obtain a solid product, which was then washed 3 times with 105 ml of toluene at 105° C. To the solid washed was added 105 ml of toluene, and after raising the temperature to 70° C., 10.5 ml (95.7 mmol) of TiCl$_4$ was added thereto. The mixture was stirred for 2 hours at 105° C. Thereafter, a solid product was separated by filtration from the mixture, washed 7 times with 105 ml of toluene at 105° C., further washed 2 times with 105 ml of hexane at room temperature, and dried under reduced pressure to obtain a solid catalyst component superior in a particle form. The solid catalyst component was found to have a Ti content of 2.17 wt %, an electron donor content of 25.6 wt % and a relative surface area of 3.4 m$^2$/g.

(2) Polymerization

Using 12.2 mg of the solid catalyst component obtained in the above (1), Example 8(2) was repeated to obtain 121 g of a polymer superior in powder properties. There was observed almost no polymer adhering to the inner wall of the autoclave and the stirrer.

The polymer production per catalyst (polymerization activity) was found to be 3320 g-polymer/g-solid catalyst component/hr, and the resulting polymer was found to have SCB: 20.4, FR: 1.31, FRR: 28.0 and CXS: 10.9 wt %, which results demonstrate that the content of lower molecular weight components therein is low.

EXAMPLE 16

(1) Production of Solid Catalyst Component

A 400 ml autoclave equipped with a stirrer was purged with nitrogen, and 21 g of the solid catalyst component precursor prepared in the same manner as in Example 1(1), 105 ml of toluene, 11.0 ml (95.7 mmol) of SiCl$_4$ and 16.1 ml (40.7 mmol) of DEHP were fed therein. The mixture was stirred at 120° C. for 2 hours. After cooling the autoclave to room temperature, the resulting mixture was transferred to a 200 ml flask purged with nitrogen. The mixture stirred was filtered to obtain a solid product, which was then washed 3 times with 105 ml of toluene at 105° C. To the solid washed was added 105 ml of toluene, and after raising the temperature to 70° C., 10.5 ml (95.7 mmol) of TiCl$_4$ was added thereto. The mixture was stirred for 1 hour at 105° C. Thereafter, a solid product was separated by filtration from the mixture, washed 7 times with 105 ml of toluene at 105° C., further washed 2 times with 105 ml of hexane at room temperature, and dried under reduced pressure to obtain a solid catalyst component superior in a particle form. The solid catalyst component was found to have a Ti content of 0.91 wt %, an electron donor content of 19.2 wt % and a relative surface area of 4.3 m$^2$/g.

(2) Polymerization

Using 15.9 mg of the solid catalyst component obtained in the above (1), Example 8(2) was repeated to obtain 124 g of a polymer superior in powder properties. There was observed almost no polymer adhering to the inner wall of the autoclave and the stirrer.

The polymer production per catalyst (polymerization activity) was found to be 2600 g-polymer/g-solid catalyst component/hr, and the resulting polymer was found to have SCB: 19.5, FR: 1.37, FRR: 25.6 and CXS: 9.2 wt %, which results demonstrate that the content of lower molecular weight components therein is low.

What is claimed is:

1. A process for producing a solid catalyst component for olefin polymerization, which comprises the step of contacting a solid catalyst component precursor (C) containing a magnesium atom, a titanium atom and a hydrocarbyloxy group, the hydrocarbyloxy group having 1 to 20 carbon atoms, with a halogeno compound (A) of the 13 or 14 group of elements in the periodic table of the elements, and an electron donor (B), the electron donor being selected from the group consisting of an organic acid esters, and an ethers, wherein the solid catalyst component precursor (C) is a trivalent titanium atom-containing solid product obtained by reducing a titanium compound (2) represented by the following formula, $$Ti(OR^1)_a X_{4-a} \quad (2)$$

wherein $R^1$ is a hydrocarbon group having 1 to 20 carbon atoms, X is a halogen atom, and "a" is a number satisfying $0 < a \leq 4$ with an organomagnesium compound (3) in the presence of an organosilicon compound (1) having an Si—O bond.

2. The process for producing a solid catalyst component for olefin polymerization according to claim 1, wherein the halogeno compound (A) is a compound represented by the following formula, $$MR_{m-a} X_a$$

wherein M is an atom belonging to the 13 or 14 group of elements in the periodic table of the elements, R is a hydrocarbon group having 1 to 20 carbon atoms, X is the halogen atom, m is a valence of M, and "a" is a number satisfying $0 < a \leq m$.

3. The process for producing a solid catalyst component for olefin polymerization according to claim 1, wherein the halogeno compound (A) is a compound represented by the following formula, $$SiR_{4-a} X_a$$

wherein R is a hydrocarbon group having 1 to 20 carbon atoms, X is a halogen atom, and "a" is a number satisfying $0 < a \leq 4$.

4. The process for producing a solid catalyst component for olefin polymerization according to claim 1, wherein the electron donor (B) is an ether.

5. The process for producing a solid catalyst component for olefin polymerization according to claim 1, wherein the electron donor (B) is a dialkyl ester of a phthalic acid.

6. The process for producing a solid catalyst component for olefin polymerization according to claim 1, where said step of contacting comprises contacting a solid catalyst component precursor (C) being a trivalent titanium atom-containing solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0 < a \leq 4$, with an organomagnesium compound (3) in the presence of an organosilicon compound (1) having an Si—O bond and a porous carrier (4) with the halogeno compound and electron donor.

7. The process for producing a solid catalyst component for olefin polymerization according to claim 1, wherein said step of contacting comprises contacting a solid catalyst component precursor (C) being a trivalent titanium atom-containing solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0 < a \leq 4$, with an organomagnesium compound (3) in the presence of an organosilicon compound (1) having an Si—O bond and a porous carrier (4), wherein the porous carrier (4) is an organic porous polymer.

8. A process for producing a catalyst for olefin polymerization, which comprises the steps of:

(i) contacting a solid catalyst component precursor (C) containing a magnesium atom, a titanium atom and a hydrocarbyloxy group, the hydrocarbykoxy group having 1 to 20 carbon atoms, with a halogeno compound (A) of the 13 or 14 group of elements in the periodic table of the elements, and an electron donor (B), the electron donor being selected from the group consisting of an organic acid ester and an ether, wherein the solid catalyst component precursor (C) is a trivalent titanium atom-containing solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0 < a \leq 4$, with an organomagnesium compound (3) in the presence of an organosilicon compound (1) having an Si—O bond, to obtain a solid catalyst component (I) for olefin polymerization; and (ii) contacting the solid catalyst component (I) with an organoaluminum compound (II).

9. A process for producing a solid catalyst component for olefin polymerization, which comprises the step of contacting an intermediate product with a compound (D) having a titanium-halogen bond, the intermediate product being obtained by contacting:

a solid catalyst component precursor (C) containing a magnesium atom, titanium atom and a hydrocarbyloxy group, the hydrocarbykoxy group having 1 to 20 carbon atoms, with a halogeno compound (A') of the 14-group of elements in the periodic table of the elements and an electron donor (B), the electron donor being selected from the group consisting of an organic acid ester and an ether, wherein the solid catalyst component precursor (C) is a trivalent titanium atom-containing solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0 < a \leq 4$, with an organomagnesium compound (3) in the presence of an organosilicon compound (1) having an Si—O bond.

10. The process for producing a solid catalyst component for olefin polymerization according to claim 9, wherein the halogeno compound (A') is a compound represented by the following formula, $$MR_{m-a}X_a$$

wherein M is an atom belonging to the 14-group of elements in the periodic table of the elements, R is a hydrocarbon group having 1 to 20 carbon atoms, X is a halogen atom, m is a valence of M, and "a" is a number satisfying $0 < a \leq m$.

11. The process for producing a solid catalyst component for olefin polymerization according to claim 9, wherein the halogeno compound (A') is a compound represented by the following formula, $$SiR_{4-a}X_a$$

wherein R is a hydrocarbon group having 1 to 20 carbon atoms, X is a halogen atom, and "a" is a number satisfying $0 < a \leq 4$.

12. The process for producing a solid catalyst component for olefin polymerization according to claim 9, wherein the electron donor (B) is an organic acid ester or an ether.

13. The process for producing a solid catalyst component for olefin polymerization according to claim 9, wherein the electron donor (B) is a dialkyl ester of a phthalic acid.

14. The process for producing a solid catalyst component for olefin polymerization according to claim 9, wherein the solid catalyst component precursor (C) is a trivalent titanium atom-containing solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0 < a \leq 4$, with an organomagnesium compound (3) in the presence of an organosilicon compound (1) having an Si—O bond and a porous carrier (4).

15. The process for producing a solid catalyst component for olefin polymerization according to claim 14, wherein the porous carrier (4) is an organic porous polymer.

16. A process for producing a catalyst for olefin polymerization, which comprises the steps of:

(i) contacting an intermediate product with a compound (D) having a titanium-halogen bond, the intermediate product being obtained by contacting a solid catalyst component precursor (C) containing a magnesium atom, titanium atom and a hydrocarbyloxy group, the hydrocarbykoxy group having 1 to 20 carbon atoms, with a halogeno compound (A') of the 14 group of elements in the periodic table of the elements and an electron donor (B), the electron donor being selected from the group consisting of an organic acid ester, and an ether, wherein the solid catalyst component precursor (C) is a trivalent titanium atom-containing solid product obtained by reducing a titanium compound (2) represented by the following formula, $$Ti(OR^1)_a X_{4-a}$$

wherein $R^1$ is a hydrocarbon group having 1 to 20 carbon atoms, X is a halogen atom, and "a" is a number satisfying $0 < a \leq 4$, with an organomagnesium compound (3) in the presence of an organosilicon compound (1) having an Si—O bond, to obtain a solid catalyst component (I') for olefin polymerization; and (ii) contacting the solid catalyst component (I') with an organoaluminum compound (II).

* * * * *